2. It is a further object of the invention to provide an improved fuel device for a gasoline engine.
United States Patent [19]
Lehar

[11] 4,332,228
[45] Jun. 1, 1982

[54] FUEL DEVICE FOR A GASOLINE ENGINE

[76] Inventor: James J. Lehar, 1915 W. MacArthur, Lot #188, Wichita, Kans. 67217

[21] Appl. No.: 122,423

[22] Filed: Feb. 19, 1980

Related U.S. Application Data

[63] Continuation-in-part of Ser. No. 847,836, Nov. 2, 1977, Pat. No. 4,196,710.

[51] Int. Cl.³ ............................................. F02M 31/00
[52] U.S. Cl. ................................... 123/557; 123/575; 261/144
[58] Field of Search ............... 123/557, 525, 575, 578, 123/503, 522; 261/44 R, 44 A, 44 E, 144, 145, 119 A, 121 B

[56] References Cited

U.S. PATENT DOCUMENTS

| 1,944,544 | 1/1934 | Cheney | 123/522 |
| 2,285,905 | 6/1942 | Cunningham | 123/557 |
| 2,312,751 | 2/1943 | Crabtree | 123/522 |
| 2,461,411 | 2/1949 | Cummings | 123/522 |
| 2,565,767 | 8/1951 | Gaskell | 123/522 |
| 3,931,801 | 1/1976 | Rose | 123/522 |
| 3,999,526 | 12/1976 | Asfar | 123/522 |

Primary Examiner—Ronald H. Lazarus
Attorney, Agent, or Firm—John H. Widdowson

[57] ABSTRACT

A fuel device for a gasoline engine. The device eliminating the sole use of a carburetor on the engine and supply the engine's intake manifold with an air fuel mixture pre-heated in a reactor housing. The air fuel mixture being heated by the engine's cooling system while the engine's exhaust fumes provide the air.

15 Claims, 19 Drawing Figures

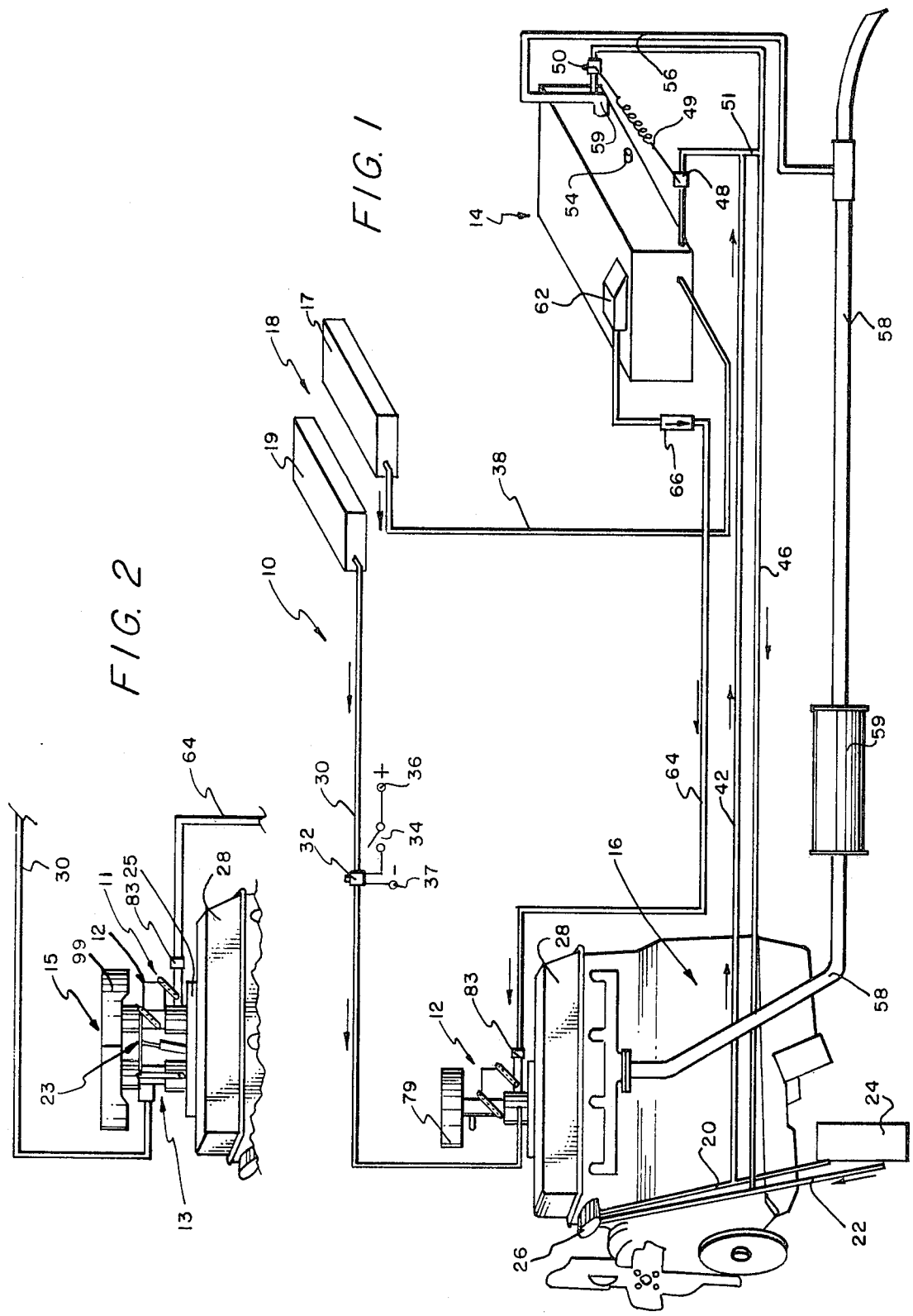

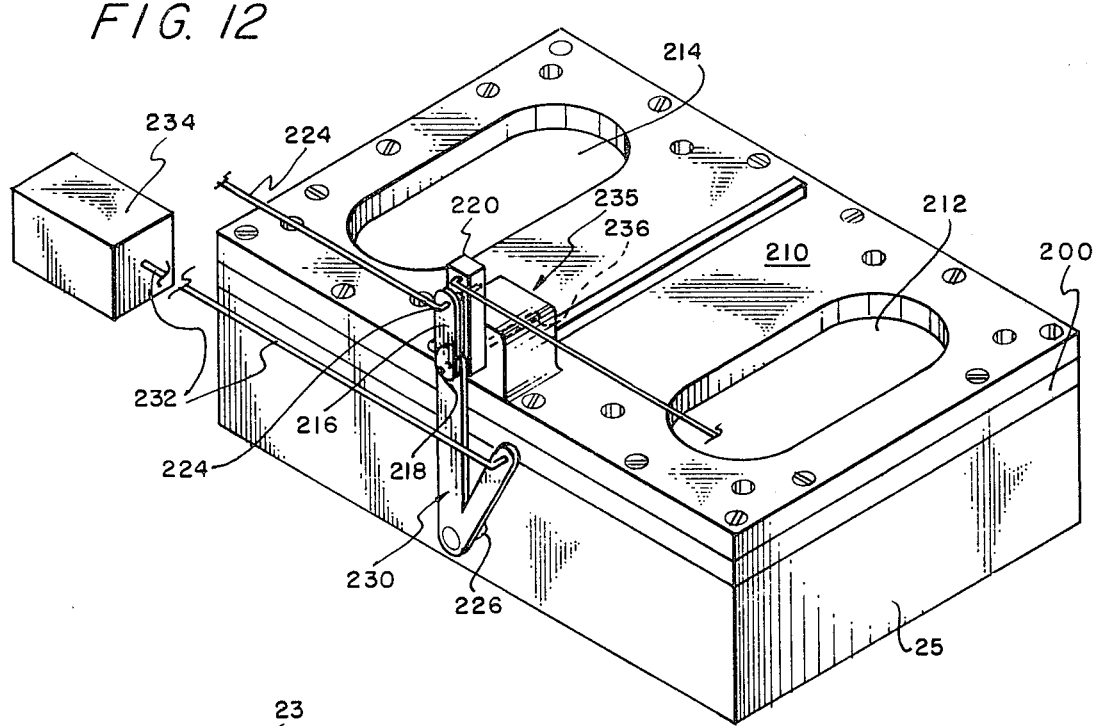
FIG. 12
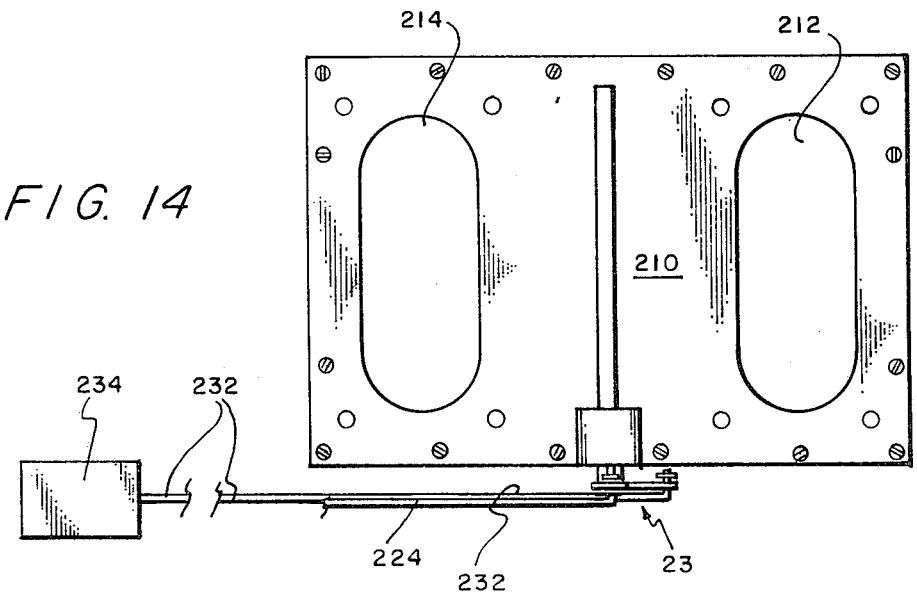
FIG. 13
FIG. 14

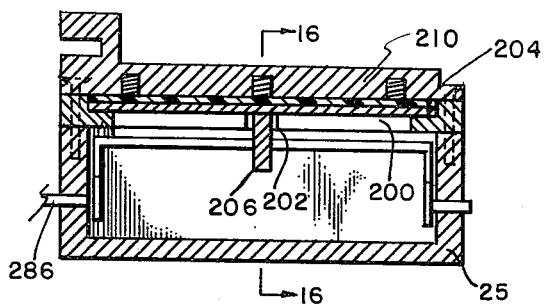
FIG. 15
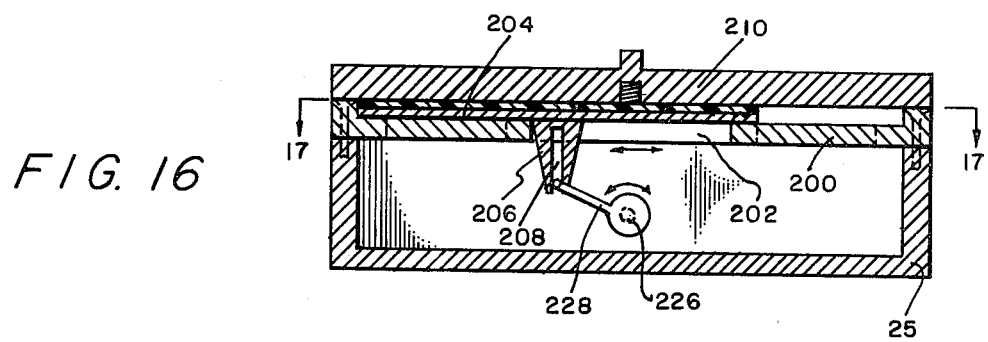
FIG. 16
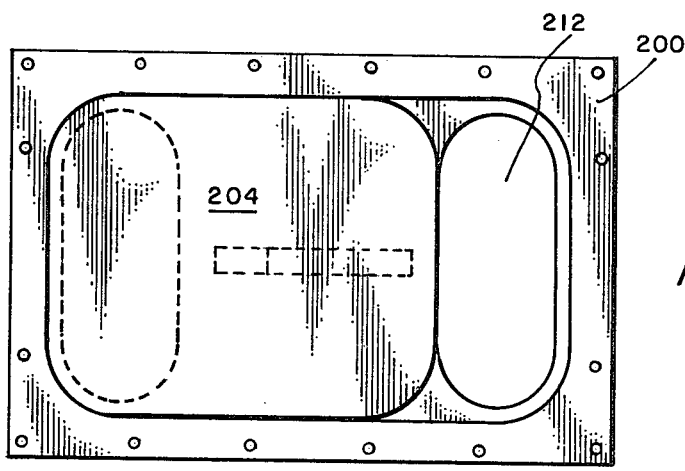
FIG. 17
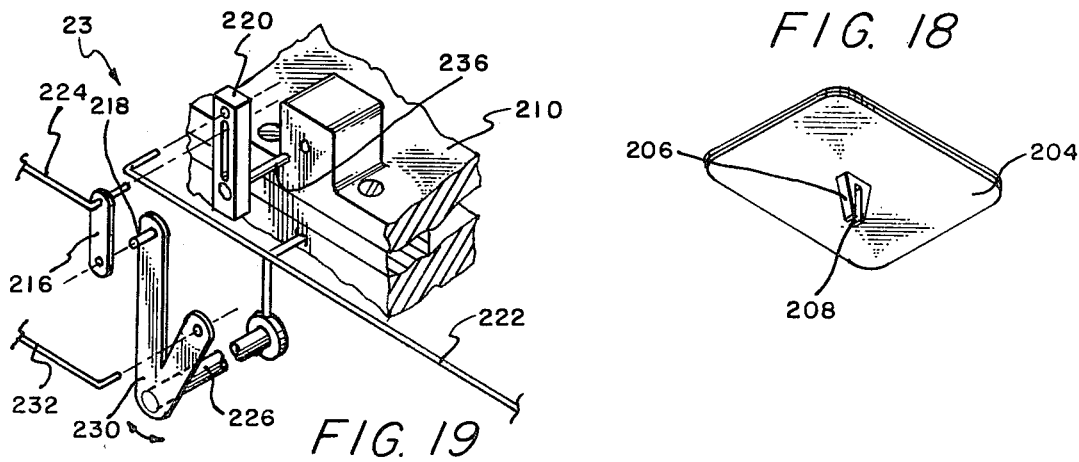
FIG. 18
FIG. 19

4,332,228

1

FUEL DEVICE FOR A GASOLINE ENGINE

BACKGROUND OF THE INVENTION

This is a continuation-in-part application of my co-pending application, Ser. No. 847,836, filed Nov. 2, 1977, now U.S. Pat. No. 4,196,710. Since my co-pending application is now a Letters of Patent, all features of the invention therein are incorporated by reference into this application.

I have discovered improvements over my invention in my co-pending application. It has been found that by utilizing air-exhaust fumes from the engine instead of a pure air compound, mileage is increased since water vapor is picked up from the fumes. The device is more efficient since less heat is required because the exhaust fumes are warmer than ambient air. It has also been found that a conventional carburetor can be used with this invention when a sliding vane valve means is provided.

SUMMARY OF THE INVENTION

The subject invention provides a more efficient system than in my co-pending application.

The fuel device for a gasoline engine includes a throttle housing mounted on top of the engine and communicably connected to the intake manifold; a reactor housing for supplying the air fuel mixture to the engine; an air fuel supply line connected to the reactor housing and an air fuel intake port in the throttle housing for supplying the air fuel mixture to the throttle housing; and a hot aqueous supply line and a hot aqueous return line connected to the engine's cooling system. A diverter exhaust conduit means interconnects the reactor housing and the exhaust system of the engine for conducting exhaust fumes from the exhaust system to the reactor housing. Also provided as another embodiment of the invention is a sliding vane valve means positioned on the engine and communicably connected to the intake manifold; a standard carburetor mounted on the sliding vane valve means; a throttle assembly also mounted thereon; and means interconnecting the carburetor and throttle assembly for disengaging the carburetor after the engine is warmed up and for engaging the throttle assembly for running the engine.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective diagram of the fuel device attached to the gasoline engine, the gasoline engine's heater, and the gasoline engine's fuel tank;

FIG. 2 is a perspective view of a carburetor and the throttle assembly mounted on top of the sliding vane valve chamber;

FIG. 12 is a perspective view of the sliding vane valve chamber along with the means for engaging or disengaging the carburetor or the throttle assembly;

FIG. 13 is a side view of the sliding vane valve chamber;

FIG. 14 is a top plan view of the sliding vane valve chamber;

FIG. 15 is a vertical sectional view of the sliding vane valve chamber;

FIG. 16 is a vertical sectional view of the sliding vane valve taken along the plane of line 16—16 in FIG. 15;

FIG. 17 is a horizontal sectional view of the sliding vane valve taken along the plane of line 17—17 in FIG. 16; and FIG. 18 is a perspective view of the sliding valve.

FIG. 19 is an exploded perspective view of the linkage arrangement used in operating the sliding vane valve.

DETAILED DESCRIPTION OF THE DRAWINGS

Figure 3:
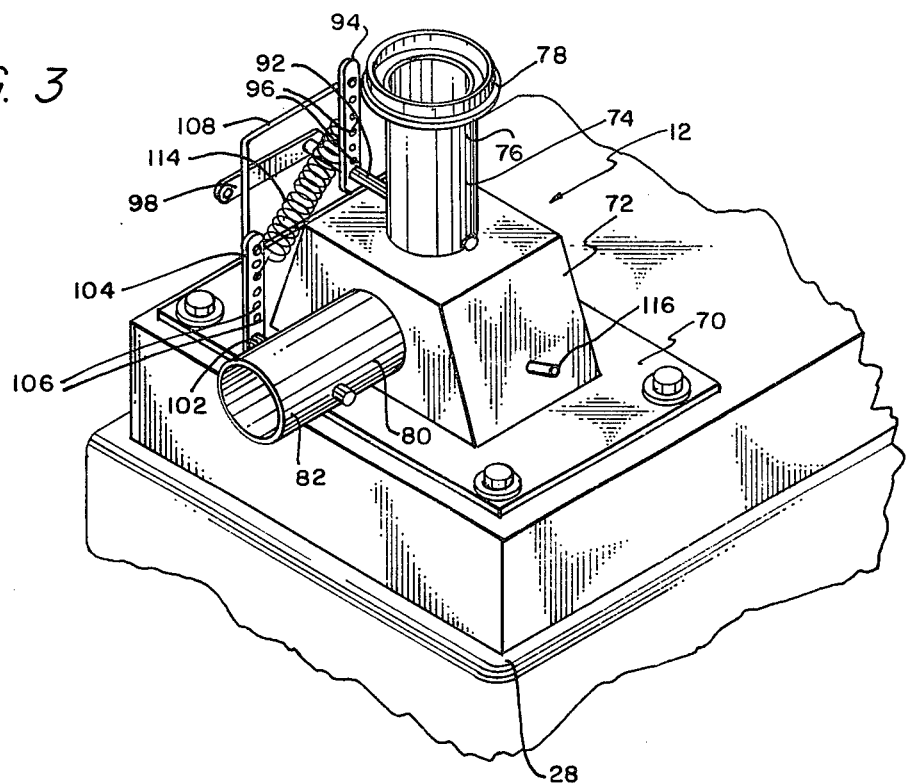
FIG. 3 is a perspective view of the fuel device's throttle housing.

In FIG. 1, the fuel device for a gasoline engine is designated broadly by general reference numeral 10. The device 10 includes a throttle housing 12 and a reactor housing 14 which are connected to a gasoline engine 16, a fuel means, generally illustrated as 18, and supply line 20, and return line 22 attached to a vehicle heater 24. The lines 20 and 22 are attached to an engine water pump 26 mounted on the engine 16.

The throttle housing 12 is mounted on top of an engine manifold 28. The fuel means 18 includes a first fuel tank 17 and a second fuel tank 19. Tank 19 is connected to the throttle housing 12 by an engine fuel supply line 30. The line 30 may include an electric solenoid valve 32 connected to an electric switch 34 having terminals 36 and 37 attached to the engine's battery which is not shown in the drawings. The solenoid valve 32 is open for supplying liquid fuel directly to the throttle housing 12 during cold start operations. When the engine 16 reaches normal operating temperatures (i.e. 100°–120° F.), the valve 32 closes and tank 17 commences supplying fuel to reactor 14 and the device 10 begins supplying a vaporized air fuel mixture directly to the engine manifold 28 for running the engine 16.

Figure 5:
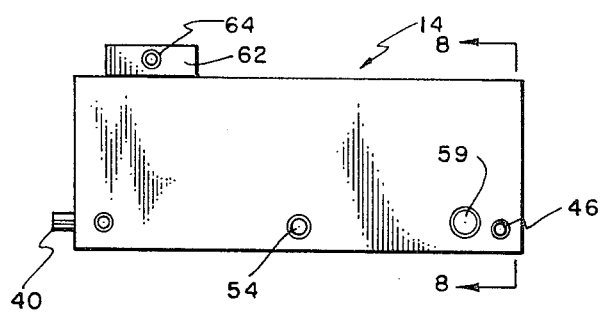
FIG. 5 is a side view of the reactor housing.
Figure 6:
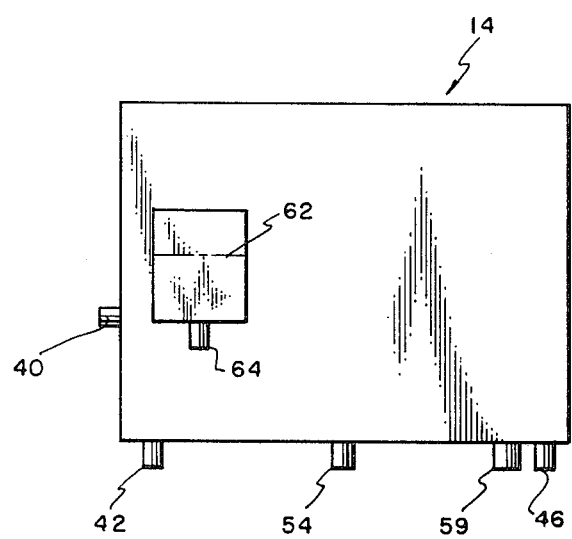
FIG. 6 is a top plan view of the reactor housing.
Figure 7:
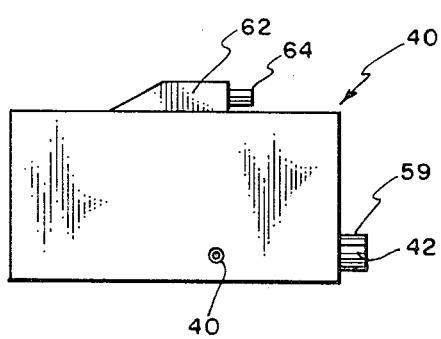
FIG. 7 is a side view of the reactor housing.

Under normal operating conditions, the tank 17 supplies fuel to the reactor housing 14 through a reactor fuel supply line 38 which is attached to a fuel supply line inlet tube 40 mounted in the side of the housing 14. The fuel in the reactor housing 14 is heated by circulating water through a hot water supply line 42 which is attached to supply line 20 and to a coiled water circulating line 44 shown in FIG. 5. The other end of the coiled water circulating line 44 is attached to a hot water return line 46 which in turn is connected to the water return line 22.

The temperature of the hot water in the lines 42 and 46 is monitored by a water temperature control valve 48 which is electrically wired by lead 49 to a heat sensing element 50 attached to the return line 46. The water temperature control valve 48 closes to maintain a maximum temperature of 100°–120° F. in the line 44. To further aid in the fuel economy on runs of over two feet in length, the line 64 is encompassed by the hot water supply line 42 to prevent the vaporized fuel from condensing back to liquid. A bypass 51 is connected between the supply line 42 and return line 46 to allow circulation of hot water when valve 48 is closed.

To further aid in heating the fuel in the reactor housing 14 for cold starts is a heating element 54 disposed inside the reactor housing 14 and connected to the engine's battery for heating the fuel therein. The fuel inside the reactor housing 14 is mixed with air-exhaust received through a conduit 56 connected to exhaust pipe 58 and having a muffler 59 connected thereto. I have discovered that by using air-exhaust instead of air as in my co-pending application, Ser. No. 847,836, filed Nov. 2, 1977, I can increase mileage from the water vapor in the air-exhaust while simultaneously making the reactor 14 non-explosive.

The air-exhaust received through the conduit 58 is mixed with the fuel and heated forming an air fuel mixture which is discharged through a reactor housing plenum 62 mounted on the top of the housing 14 and connected to one end of an air fuel supply line 64. The supply line 64 feeds the vaporized air fuel mixture directly into the throttle housing 12 thereby eliminating the need of a carburetor. The supply line 64 includes the safety feature of a check valve 66 mounted in the line 64. The check valve 66 allows the air fuel mixture to flow into the throttle housing 12 but closes when there is a reverse flow of the air fuel mixture due to a backfire in the engine manifold 28. The valve 66 prevents a possible explosion and the destruction of the reactor housing 14.

FIG. 2 is a perspective view of a sliding vane valve assembly, generally illustrated as 11, including throttle housing 12, a carburetor assembly, generally illustrated as 13, and an air cleaner 15 having divider 97 with chambers 99 and 21. Throttle housing 12 and carburetor assembly 13 are interconnected by means 23 for disengaging the carburetor 13 after the engine 16 is warm and for engaging the throttle housing 12 for running the engine 16 on the air-fuel mixture. Throttle housing 12 and carburetor assembly 13 are mounted on top of a sliding vane valve assembly chamber 25.

In FIG. 3, a perspective view of the throttle housing 12 is illustrated. The throttle housing 12 includes a manifold adaptor 70 for mounting on top of the engine manifold 28. Mounted on top of the manifold adaptor 70 is a plenum 72 having an upwardly extending air intake port 74 with an upper end portion 76 having an air cleaner adaptor 78 mounted thereon for receiving an air cleaner 79. The air cleaner 79 is shown in FIG. 1.

Extending outwardly from the side of the plenum 72 is an air fuel intake port 80 having an end portion 82 which is attached to the air fuel supply line 64 by a rubber flexible coupling 83 for receiving the air fuel mixture therein. The coupling 83 is shown in FIG. 1 and absorbs any vibration transmitted from the engine 16 to the line 64.

Figure 4:
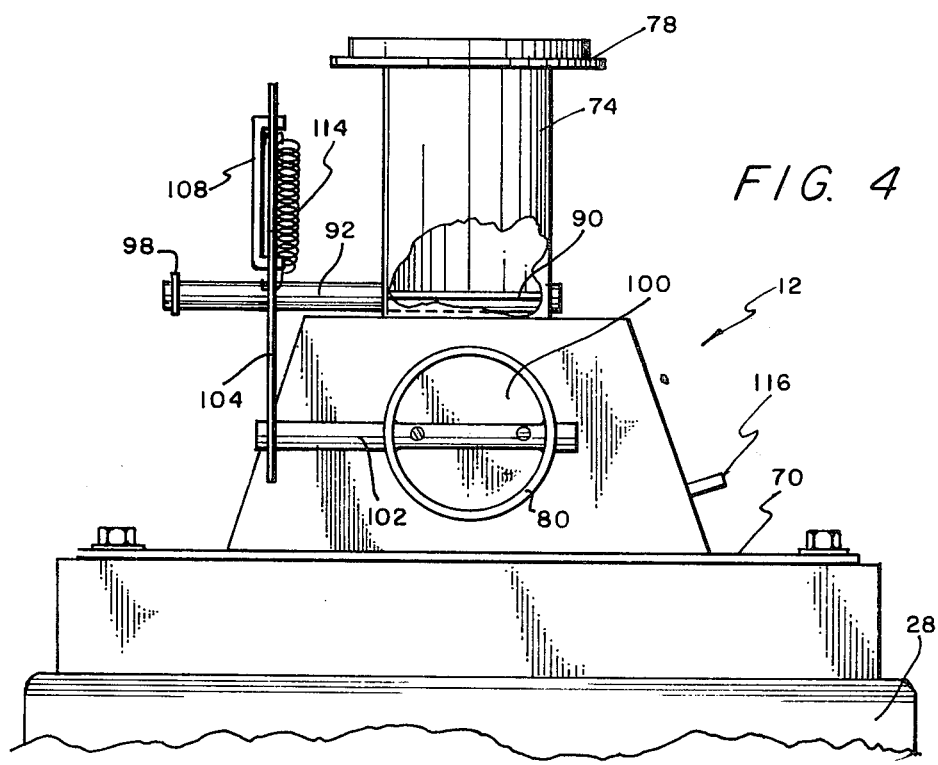
FIG. 4 is a side view of the throttle housing.

Mounted in the air intake port 74 is an intake control valve 90 shown in FIG. 4 and pivotally mounted on a shaft 92. The shaft 92 is attached to an air intake lever 94 having a plurality of apertures 96 therein. Mounted on the end of the shaft 92 is a linkage arm 98 which is attached to the accelerator pedal of the engine 16. The connection between the pedal and the linkage arm 98 is not shown in the drawing. As the accelerator pedal is pushed downward thereby accelerating the engine 16, the linkage arm 98 is pivoted downwardly thereby opening the air intake control valve 90 increasing the amount of intake air through the air intake port 74. If desired, the original equipment carburetor can be used in place of intake port 74, the carburetor butterfly valve being used in place of butterfly valve 90.

The air fuel intake port 80 includes an air fuel intake control valve 100 shown in dotted lines which is used for controlling the amount of air fuel mixture received into the plenum 72. The control valve 100 includes a shaft 102 extending outwardly from the port 80 and having an air fuel intake lever 104 attached thereto and including a plurality of apertures 106. The lever 106 is attached to the air intake lever 94 by an "L"-shaped lever arm 108 having a first end portion 110 received in the apertures 96 and a second end portion 112 received in the apertures 106 of the lever 104.

By connecting the air intake lever 94 with the air fuel intake lever 104 through lever arm 108, the air fuel intake control valve 100 is responsive to the movement of the air intake control valve 90 and is opened and closed in response to the acceleration of the engine. By adjusting the lever arm 108 in the apertures 96 and 106, the correct ratio of intake air through the air intake port 74 may be regulated with the air fuel mixture received through the air fuel intake port 80. The levers 94 and 104 are also attached to the ends of a coil spring 114 which is used to eliminate any play between the levers 94 and 104.

Mounted on one side of the plenum 72 is a liquid fuel intake port 116 having a meter valve disposed therein which is attached to the fuel supply line 30 for receiving liquid fuel directly into the engine 16 during the cold starting of the engine 16.

In FIGS. 5-11 are various views of the reactor housing 14 as illustrated. The reactor housing plenum 62 can be seen attached to the top of the housing 14 with a portion of the air fuel supply line 64 extending outwardly therefrom. Also shown extending outwardly from one of the reactor housing sides is the heating element 54, the exhaust conduit 59, the hot water supply tube 42, and the hot water return line 46.

Figure 9:
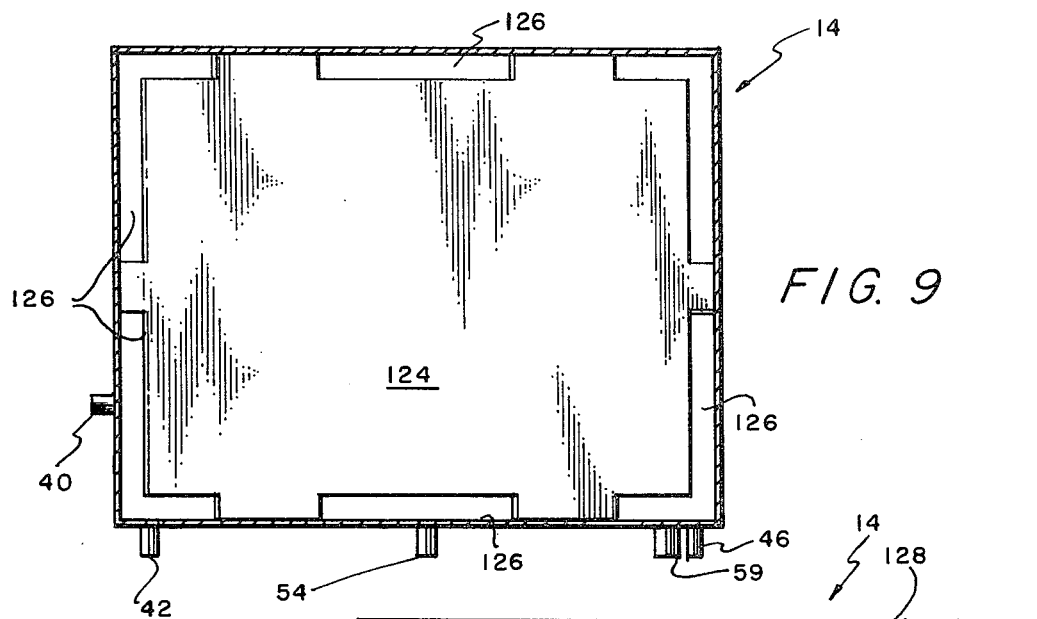
FIG. 9 is a horizontal sectional view of the reactor housing taken along the plane of line 9—9 in FIG. 8.

In FIG. 9, a top view of the reactor housing 14 is illustrated with the top of the housing 14 removed showing a metal baffle 124 having openings 126 along the sides of the baffle 124. The vaporized air fuel mixture rises in the reactor housing 14 and is circulated through the openings 126 where it is discharged through the reactor housing plenum 62. Should there be any condensation of the fuel as it rises, the fuel is collected on the baffle 124 and is drained downwardly back into the liquid fuel level in the bottom of the reactor housing 14.

Figure 10:
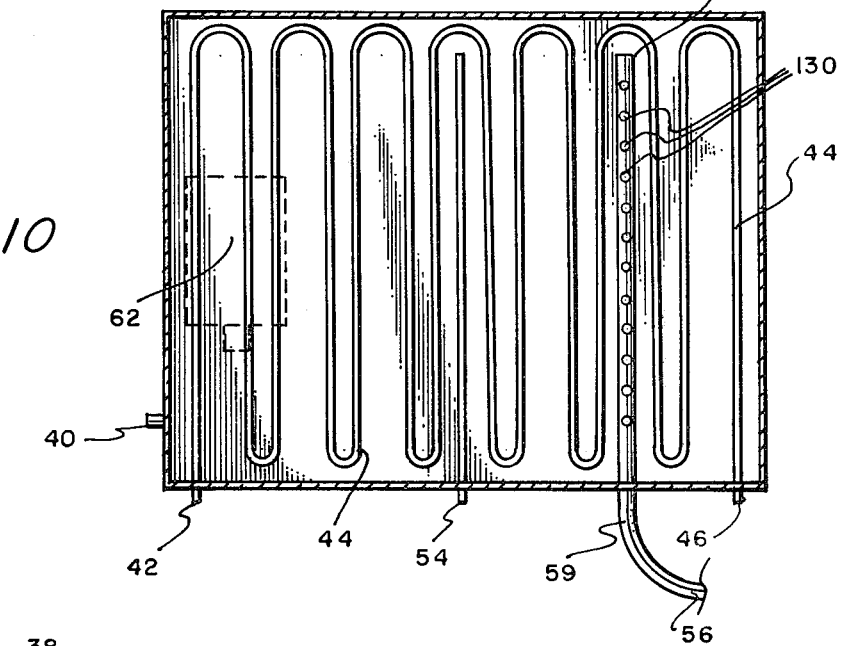
FIG. 10 is a horizontal sectional view of the reactor housing taken along the plane of line 10—10 in FIG. 8.

In FIG. 10, a top view of the reactor housing 14 is illustrated with the baffle 124 and a filter means 136 removed and illustrating the coiled water circulating line 44 connected to the hot water supply line 42 and the hot water return line 46. Also seen in this view is an end portion 128 of the exhaust conduit 59 having a plurality of apertures 130 therein. The apertures 130 circulate air-exhaust received into the liquid fuel in the bottom of the reactor housing 14.

Figure 8:
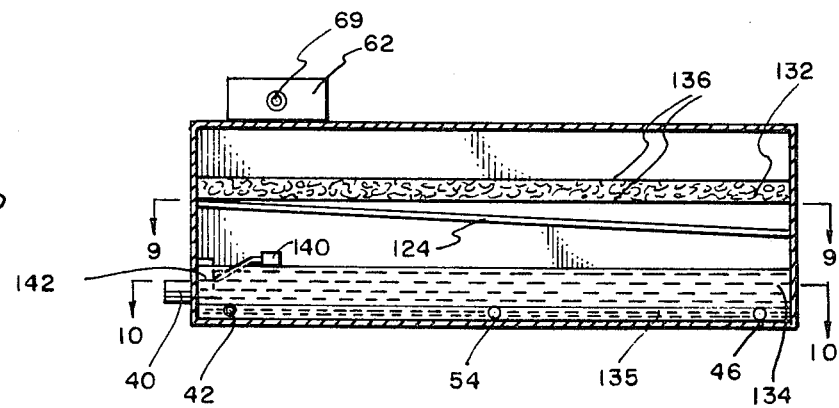
FIG. 8 is a vertical sectional view of the reactor housing taken along the plane of line 8—8 in FIG. 5.

In FIG. 8, a side view of the reactor housing 14 is illustrated and showing a fuel fiberglass filter 132 disposed above baffle 124 and a fuel level 134 shown in the bottom of the housing 14. This filter 132 aids in vaporization of the fuel. Below the fuel level is shown a water level 135. The filter 132 includes wire mesh 136 disposed on the top and bottom of the filter 132. The wire mesh 136 is shown in dotted lines. As the air fuel mixture is vaporized and rises, the fuel filter 132 acts to filter any condensed liquid fuel out of the vapor mixture and returns the liquid fuel to the liquid level 134. Mounted below the filter 132 is the baffle 124 at an angle from the horizontal for returning the fuel to the fuel level 134. The liquid level of the fuel in the reactor housing 14 is controlled by a float 140 shown in dotted lines andattached to a float valve 142. The valve 142 is communicable connected to the fuel supply line 38 at inlet tube 40. When the desired level is reached, the float valve 142 shuts off the supply line 38 until fuel again is required in the housing 14.

Figure 11:
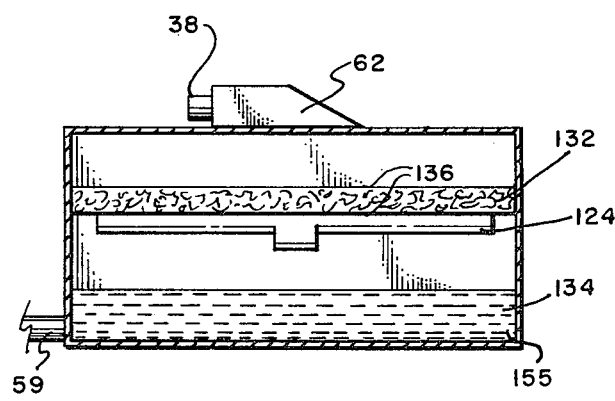
FIG. 11 is a vertical sectional view of the reactor housing.

In FIG. 11, an end view of the housing 14 is illustrated. This view is similar to the view in FIG. 8 and again shows the reactor housing plenum 62 mounted on top of the housing 14. Shown is the baffle 124 disposed below the fiberglass filter 132.

FIGS. 12-18 disclose the lower portion of sliding vane valve assembly 11 comprising chamber 25 and means 23 interconnecting the carburetor 13 and throttle assembly 12 for disengaging the carburetor 13 after the engine is warm and for engaging the throttle assembly 12 for running the engine 16 on the air-exhaust fuel mixture. Sliding vane valve assembly 11 has been discovered to facilitate the use of this invention with the standard carburetor 13 to warm the engine 16 with the use of fuel (e.g. gas) in fuel tank 19 and as a stand-by fuel system in the event the operator of the engine 16 is on vacation and cannot get fuel (e.g. alcohol) for tank 17. Valve guide 200 is attached to the chamber 25 and has a slot 202. Slide valve 204 is slidably disposed on the valve guide 200. Slide valve 204 has a tab 206 with a female recess 208. Tab 206 extends through slot 202. A chamber cover plate 210 attaches to the valve guide 200 and has a throttle aperture 212 and a carburetor aperture 214.

Means 23 interconnecting the carburetor 13 and the throttle assembly housing 12 operatively engages a slide valve control means 230 (see FIG. 12) to slide the sliding valve 204 to close the carburetor aperture 214 and open the throttle aperture 212, or to open the carburetor aperture 214 and close the throttle aperture 212, depending on whether the throttle 12 or carburetor 13 is engaged to run the engine 16.

Means 23 includes a first lever 220 pivoting on a pin 236 at a point in line with bell crank 230, pin 218, a throttle linkage 222 attached to lever 220 and to the throttle assembly 12 (see FIG. 2 wherein linkage 222 attaches to lever 94, see FIG. 3). A carburetor linkage 224 connects in the slot in the lever 220 after passing through lever 216 and connects to the carburetor 13 (well known in the art). Slide valve control means is a shaft 226 rotatably disposed in the chamber 25 and a male lever 228 attached to pivot shaft 226 and engages the female recess 208 for sliding the sliding valve 204. A bell crank means 230 connects to the shaft 226, and solenoid 234 by linkage 232 for operating the bell crank means (e.g. a solenoid means). Bell crank 230 is fixed solid to shaft 226 and moves shaft 226 to turn lever 228 and operate sliding valve 204 by means of tab 206.

The accelerator linkage 23 connects to pin shown on top of lever 220. Solenoid 234 in de-energized position as shown lets both carburetor and throttle assembly's operate mechanically. In this position the sliding valve 204 blocks opening 212 preventing air flow through the throttle and opening 214 is open allowing air flow and usage of the carburetor.

When the solenoid 234 is energized or a usual manual cable (not shown) is connected to rod 232 and is pulled, this moves bell crank 230 counterclockwise. Counterclockwise movement of the bell crank 230 pulls rod 224 down the slot in lever 220 by means of the linkage 216 until the rod 224 is in the center line of lever 220 pivot shaft or pin 236 in the boss 235A part of plate 210. At the same time the bell crank 230 connected to shaft 226 and sliding valve 204 moves the sliding valve, closing opening 214, stopping air flow and use of the carburetor, and opens opening 212 allowing air passage and use of the throttle assembly. In de-energized position the bell crank pin 218 is centered in line with the lever 220 pin 236 or shaft in the boss 235. This allows the linkage 216 to move or follow with the movement of lever 220 and retaining rod 224 in the top of the slot in lever 220 without any binding.

Changes may be made in the construction and arrangement of the parts or elements of the embodiment as disclosed herein without departing from the spirit or scope of the invention as defined in the following claims.

I claim:

1. A fuel device for a gasoline engine having an exhaust system means, the device communicably connected to the engine's intake manifold, the engine fuel means, and the engine's cooling system, the device comprising:

a throttle housing mounted on top of the engine and communicably connected to the intake manifold, said throttle housing having an air intake port for receiving air, said air intake port having an air intake control valve mounted therein, said air intake control valve connected to an accelerator means of the engine, said air intake control valve attached to means extending outwardly from said air intake port with an air intake control means mounted thereon, said housing further including an air fuel intake port for receiving an air fuel mixture, said air fuel intake port having an air fuel control valve mounted therein, said air fuel control valve pivotally connected to said air intake control valve and responsive to the movement of said air intake control valve;

a reactor housing for supplying the air fuel mixture to the engine, said reactor housing communicably connected to the fuel means for supplying fuel to said reactor housing;

an air fuel supply line connected to said reactor housing and said air fuel intake port for supplying the air fuel mixture to said throttle housing;

a hot aqueous supply line and a hot aqueous return line connected to the engine's cooling system, said supply and return lines connected to an aqueous fluid circulating means mounted in the bottom of said reactor housing for heating the fuel in said reactor housing; and a diverter exhaust conduit means interconnecting said reactor housing and said exhaust system means for conducting exhaust fumes from said exhaust system means into said reactor housing to pick-up said fuel and mix with water vapor from the exhaust system means and increase mileage while making said reactor housing non-explosive, said air fuel control valve is operatively mounted on means extending outwardly from said air fuel intake port and attached to an air fuel intake control means, said air fuel intake control means connected to one end of a connecting means, the other end of said connecting means connected to said air intake control means so that when said air intake control valve is opened said air fuel intake control valve in turn is opened, said reactor housing including heating means disposed therein and connected to an electrical power supply means of said engine; and said air intake control means and said air fuel intake control means include means for adjusting the movement of said air intake control valve in relation to the movement of the air fuel intake control valve for regulating the amount of air received through said air intake port in relationship to the amount of air fuel mixture received through said air fuel intake port.

2. The fuel device of claim 1 wherein said engine fuel means comprises a first fuel means connecting to said reactor housing by a first fuel conduit means, and a second fuel means connecting to said throttle housing by a second fuel conduit means.

3. The fuel device of claim 1 wherein said diverter exhaust conduit means additionally has a structure within said reactor housing defining a plurality of outlets for emitting exhaust fumes into the fuel means in said reactor housing.

4. The fuel device of claim 2 additionally including a liquid level control means mounted inside said reactor housing and communicably connected to said first fuel conduit for maintaining a substantially constant level of fuel in the bottom of said reactor housing; a fuel filter means mounted in said reactor housing and disposed above the fuel level in said reactor housing; means in the reactor housing disposed below said fuel filter means for collecting fuel condensed in the upper portion of said reactor housing; said reactor housing having a plenum communicably connected to said air fuel supply line; in operation said plenum receiving heated air fuel mixture therein and discharging said air fuel mixture into said air fuel supply line.

5. The fuel device of claim 4 additionally including air fuel check valve means mounted in said air fuel supply line, said check valve means open when supplying said air fuel mixture to the throttle, said check valve means closed to prevent reverse flow of said air fuel mixture to said reactor housing when a backfire occurs in said intake manifold; temperature control means mounted on said hot aqueous fluid supply line and operatively connected to said hot aqueous return line for controlling hot aqueous fluid temperature circulated through said aqueous fluid circulating means.

6. A fuel device for a gasoline engine having an exhaust system means, the device communicably connected to the engine's intake manifold, the engine fuel means, and the engine's cooling system, the device comprising a sliding vane valve means positioned on said engine and communicably connected to the intake manifold, a carburetor mounted on said sliding vane valve means, a throttle assembly mounted on said sliding vane valve means, means interconnecting said carburetor and throttle assembly for disengaging the carburetor after the engine is warm and for engaging a throttle assembly for running the engine on the air-fuel mixture, said throttle assembly comprising a throttle housing mounted on top of the engine and communicably connected to the intake manifold, said throttle housing having an air intake port for receiving air, said air intake port having an air intake control valve mounted therein, said air intake control valve connected to an accelerator means of the engine, said air intake control valve attached to means extending outwardly from said air intake port with an air intake control means mounted thereon, said housing further including an air fuel intake port, said air fuel intake port having an air fuel control valve mounted therein, said air fuel control valve pivotally connected to said air intake control valve and responsive to the movement of said air intake control valve; a reactor housing for supplying the air fuel mixture to the engine, said reactor housing communicably connected to the fuel means for supplying fuel to said reactor housing; an air fuel supply line connected to said reactor housing and said air fuel intake port for supplying the air fuel mixture to said throttle housing; an air fuel supply line connected to said reactor housing and said air fuel intake port for supplying the air fuel mixture to said throttle housing; a hot aqueous supply line and a hot aqueous return line connected to the engine's cooling system, said supply and return lines connected to an aqueous fluid circulating means mounted in the bottom of said reactor housing for heating the fuel in said reactor housing; and air-exhaust supply means for said reactor housing, said air fuel control valve is operatively mounted on means extending outwardly from said air fuel intake port and attached to an air fuel intake control means, said air fuel intake control means connected to one end of a connecting means, the other end of said connecting means connected to said air intake control means so that when said air intake control valve is opened said air fuel intake control valve in turn is opened, said reactor housing including heating means disposed therein and connected to an electrical power supply means of said engine; and said air intake control means and said air fuel intake control means include means for adjusting the movement of said air intake control valve in relation to the movement of the air fuel intake control valve for regulating the amount of air received through said air intake port in relationship to the amount of air fuel mixture received through said air fuel intake port.

7. The fuel device of claim 6 wherein said air-exhaust supply means comprises a diverter exhaust conduit means interconnecting said reactor housing and said exhaust system means for conducting exhaust fumes from said exhaust system means into said reactor housing to pick-up fuel and the water vapor from the exhaust system means and increase mileage while making said reactor housing non-explosive.

8. The fuel device of claim 7 additionally including an air cleaning means mounted on top of said carburetor and said throttle assembly.

9. The fuel device of claim 6 wherein said sliding vane valve means comprises a bottom chamber; a valve guide attached to the chamber and having a structure defining a slot, a sliding valve slidably disposed on said valve guide, said sliding valve additionally including a tab extending through said slot, said tab having a female recess; a chamber cover plate attached to said valve guide and includes a structure defining a throttle aperture and a carburetor aperture; said means interconnecting said carburetor and throttle assembly operatively engaging a sliding valve control means at a pivot point to slide said sliding valve to close said carburetor aperture and open said throttle aperture or to open said carburetor aperture and close said throttle aperture, depending on whether the throttle or carburetor is engaged to run the engine.

10. The fuel device of claim 9 wherein said means interconnecting said carburetor and throttle assembly comprises a first lever pivoting at said pivot point, and a throttle linkage attached to said first lever and to said throttle assembly, and a carburetor linkage engaged to said first lever and said carburetor.

11. The fuel device of claim 10 wherein said slide valve control means comprises a pivot bar rotatably disposed in said bottom chamber, a male lever attached to said pivot bar and engaging said female recess for sliding said sliding valve, a bell crank means connected at said pivot point and said pivot bar, and means for engaging said bell crank means to slide said sliding valve.

12. The fuel device of claim 11 wherein said engine fuel means comprises a first fuel means connecting to said reactor housing by a first fuel conduit means, and a second fuel means connecting to said carburetor by a second fuel conduit means.

13. The fuel device of claim 7 wherein said diverter exhaust conduit means additionally has a structure within said reactor housing defining a plurality of outlets for emitting exhaust fumes into the fuel means in said reactor housing.

14. The fuel device of claim 6 additionally including a liquid level control means mounted inside said reactor housing and communicably connected to said first fuel conduit for maintaining a substantially constant level of fuel in the bottom of said reactor housing; a fuel filter means mounted in said reactor housing and disposed above the fuel level in said reactor housing; means in the reactor housing disposed below said fuel filter means for collecting fuel condensed in the upper portion of said reactor housing; said reactor housing having a plenum communicably connected to said air fuel supply line; in operation said plenum receiving heated air fuel mixture therein and discharging said air fuel mixture into said air fuel supply line.

15. The fuel device of claim 14 additionally including air fuel check valve means mounted in said air fuel supply line, said check valve means open when supplying said air fuel mixture to the throttle, said check valve means closed to prevent reverse flow of said air fuel mixture to said reactor housing when a backfire occurs in said intake manifold; temperature control means mounted on said hot aqueous fluid supply line and operatively connected to said hot aqueous return line for controlling hot aqueous fluid temperature circulated through said aqueous fluid circulating means.

* * * * *